(12) United States Patent
Kasuya et al.

(10) Patent No.: US 10,000,167 B2
(45) Date of Patent: Jun. 19, 2018

(54) WIRE HARNESS

(71) Applicant: FUJI JUKOGYO KABUSHIKI KAISHA, Tokyo (JP)

(72) Inventors: Yuji Kasuya, Tokyo (JP); Noboru Matsumoto, Tokyo (JP)

(73) Assignee: Subaru Corporation, Tokyo (JP)

( * ) Notice: Subject to any disclaimer, the term of this patent is extended or adjusted under 35 U.S.C. 154(b) by 0 days. days.

(21) Appl. No.: 14/885,841

(22) Filed: Oct. 16, 2015

(65) Prior Publication Data
US 2016/0107587 A1 Apr. 21, 2016

(30) Foreign Application Priority Data
Oct. 16, 2014 (JP) .................................. 2014-211925

(51) Int. Cl.
*B60R 16/02* (2006.01)
*H02G 3/04* (2006.01)
*H02G 3/32* (2006.01)

(52) U.S. Cl.
CPC ....... *B60R 16/0215* (2013.01); *H02G 3/0406* (2013.01); *H02G 3/0481* (2013.01); *H02G 3/32* (2013.01); *H02G 2200/20* (2013.01)

(58) Field of Classification Search
USPC ....................................................... 174/72 A
See application file for complete search history.

(56) References Cited

U.S. PATENT DOCUMENTS 5,911,450 A * 6/1999 Shibata ............... B60R 16/0207
174/112
6,437,248 B1 * 8/2002 Giebel ................. G02B 6/4482
174/110 R
8,444,216 B2 * 5/2013 Yamaguchi ......... B60R 16/0207
296/208

FOREIGN PATENT DOCUMENTS

| JP | S63-199412 A | | 12/1988 |
|---|---|---|---|
| JP | 06150744 A | * | 5/1994 |
| JP | 09-180545 A | | 7/1997 |
| JP | H09-180545 A | | 7/1997 |
| JP | 09-213141 A | | 8/1997 |
| JP | H09-213141 A | | 8/1997 |
| JP | H09-259641 A | | 10/1997 |
| JP | 2000-329547 A | | 11/2000 |
| JP | 2002-029256 A | | 1/2002 |
| JP | 2014-143781 A | | 8/2014 |

OTHER PUBLICATIONS

Office Action received for Japanese Patent application No. 2014-211925, dated Sep. 6, 2016, 5 pages of office action including 3 pages of English translation.
Office Action received for Japanese Patent application No. 2014-211925, dated Feb. 21, 2017, 2 pages of office action including 3 pages of English translation.

* cited by examiner

*Primary Examiner* — William H Mayo, III
*Assistant Examiner* — Krystal Robinson
(74) *Attorney, Agent, or Firm* — Chip Law Group

(57) ABSTRACT

A wire harness includes a cable unit, and an indicator is provided on a back surface portion of an outer circumference surface of the cable unit, the back surface portion being positioned on an opposite side to a front surface portion that is visually recognizable from a direction in which the wire harness is visually recognizable to a worker in a state in which the cable unit is attached to a vehicle.

12 Claims, 6 Drawing Sheets

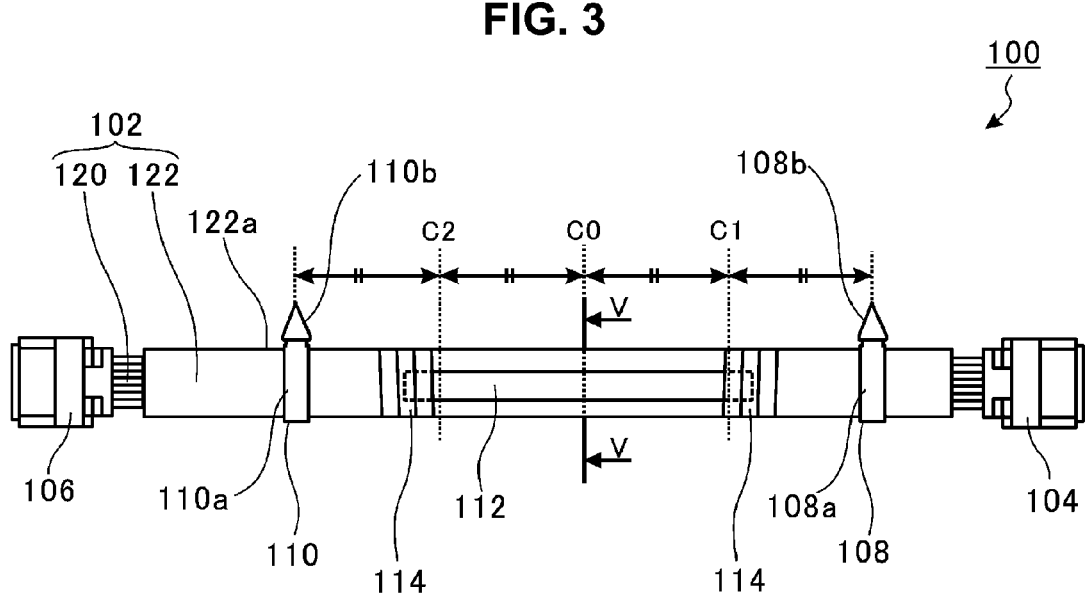
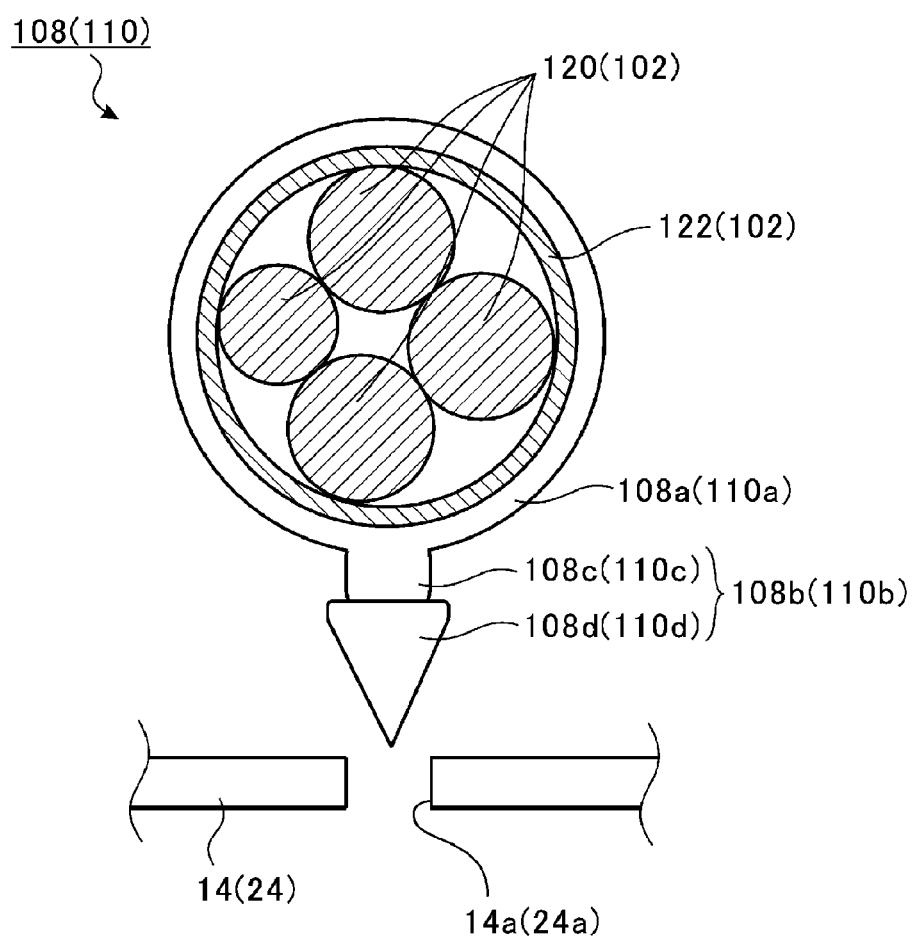

WIRE HARNESS

CROSS-REFERENCE TO RELATED APPLICATIONS

The present application claims priority from Japanese Patent Application No. 2014-211925 filed on Oct. 16, 2014, the entire contents of which are hereby incorporated by reference.

BACKGROUND

1. Technical Field

The present disclosure relates to a wire harness to be attached to a vehicle.

2. Related Art

When a wire harness that bundles cables is attached to a vehicle as twisted, the cable undergoes excessive tensional force of the twist, which can cause cable disconnection. Thus, such twist conventionally needs finding.

Various technologies have been disclosed for finding twist of a wire harness. For example, it is proposed to provide a tape to the outer circumference surface of a sheathing layer that sheathes bundled cables along the longitudinal direction of the cables, the tape having a different color from the color of the sheathing layer (for example, Japanese Unexamined Utility Model (Registration) Application Publication (JP-UM-A) No. S63-199412, and Japanese Unexamined Patent Application Publication (JP-A) No. H9-213141). It is also proposed to provide a rod-like member having a straight shape to the outer circumference surface of the sheathing layer along the longitudinal direction of the cables (for example, JP-A No. H9-180545, and JP-A No. 2000-329547). Alternatively, it is proposed to provide a marker elongated body distinguishable from the cables to the outer circumference of the cables (for example, JP-A No. H9-259641).

As described above, a criterial indicator such as a tape, a rod-like member, and a marker elongated body on a wire harness allows for the use of distortion, inclination, or the like of the indicator as a determination criterion for finding twist of the wire harness.

However, the above disclosed technologies need to dispose the criterial indicator serving as a criterion for finding twist at a visually recognizable position on the wire harness to be attached to a vehicle, so that the wire harness can be disfigured.

SUMMARY OF THE INVENTION

Thus, an object of the present disclosure is to provide a wire harness that allows twist to be found without causing disfigurement of the wire harness.

A wire harness according to an aspect of the present disclosure includes a cable unit, and an indicator provided that is on a back surface portion of an outer circumference surface of the cable unit, the back surface portion being positioned on an opposite side to a front surface portion that is visually recognizable from a direction in which the wire harness is visually recognizable to a worker in a normal attachment state in which the cable unit is attached to a vehicle in a predefined attachment manner.

The wire harness may further include fixation members that are provided on the outer circumference surface of the cable unit, and fix the cable unit to the vehicle. The indicator may be provided, along an extending direction of the cable unit, at a substantial center between any two of the fixation members, the any two fixation members being adjacent to each other along the extending direction of the cable unit.

The indicator may be provided within two areas positioned close to a center among four areas formed by equally dividing, into four, an area between one of the two adjacent fixation members along the extending direction of the cable unit and the other of the two adjacent fixation members along the extending direction of the cable unit.

The wire harness may further include fixation members that are provided on the outer circumference surface of the cable unit, and fix the cable unit to the vehicle. The indicator may be provided, along an extending direction of the cable unit, at a substantial center between a branch position in the cable unit where the cable unit branches and the fixation member adjacent to the branch position or another branch position adjacent to the branch position.

The indicator may be provided within two areas positioned close to a center among four areas formed by equally dividing, into four, an area between the branch position in the cable unit where the cable unit branches and the fixation member adjacent to the branch position or the other branch position adjacent to the branch position.

The cable unit may connect an engine in the vehicle and a control unit that controls the engine. The indicator may be provided on the back surface portion positioned on the opposite side to the front surface portion that is visually recognizable from the direction in which the wire harness is visually recognizable to the worker when a hood that opens and closes an engine room including the engine is opened.

BRIEF DESCRIPTION OF THE DRAWINGS

FIG. 3 describes a configuration of the wire harness;

FIG. 4 describes a configuration of a latch of a fixation member and a retainer provided on an engine and an ECU;

DETAILED DESCRIPTION

Figure 1:
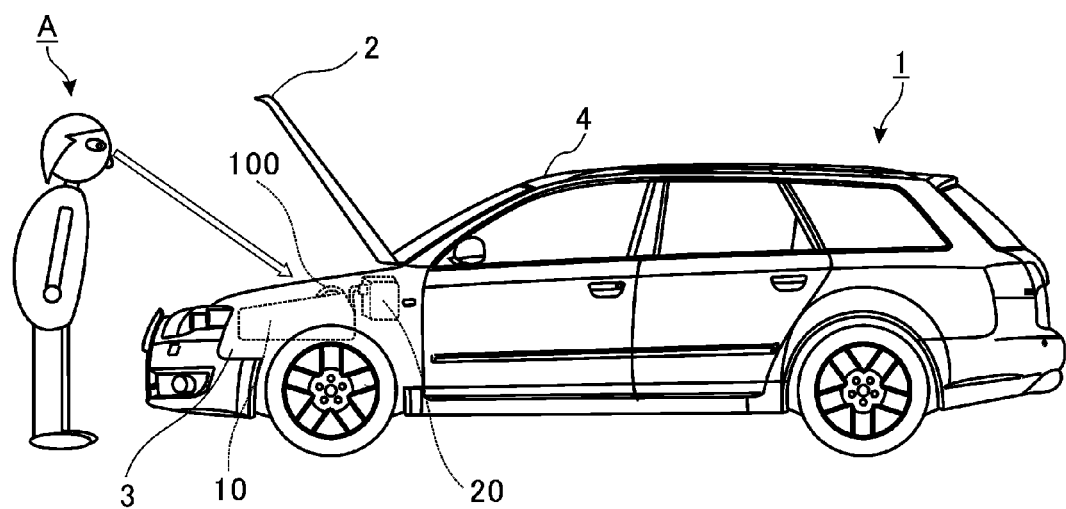
FIG. 1 is a side view of a vehicle.

Hereinafter, preferred implementations of the present disclosure will be described in detail with reference to the appended drawings. Dimensions, material, and other specific numerical values mentioned in the implementations are merely examples for facilitating understanding of the present disclosure, and do not limit the present disclosure if not stated otherwise. Note that, in this specification and the appended drawings, structural elements that have substantially the same function and structure are denoted with the same reference numerals, and repeated explanation of these structural elements is omitted. Elements not directly related to the present disclosure are not illustrated in the drawings.

FIG. 1 is a side view of a vehicle 1. The advancing direction of the vehicle 1 and the reversing direction of the vehicle 1 will be respectively referred to as front side (left side in FIG. 1) and rear side (right side in FIG. 1). As illustrated in FIG. 1, the vehicle 1 includes, for example, an engine 10, an engine control unit (ECU) 20 that controls and drives the engine 10, and a wire harness 100 that electrically connects the engine 10 and the ECU 20 in an engine room surrounded by a hood 2 and fenders 3 that cover the front wheels of the vehicle 1. The vehicle 1 drives the engine 10 on the basis of the control of the ECU 20, and the vehicle 1 runs by the power of the engine 10.

The hood 2 is a plate-shaped member connected with a vehicle main body 4 on the rear side of the hood 2 via a hinge mechanism, and is openable and closable using the hinge mechanism as a support. Opening the hood 2 of the vehicle 1 makes the engine 10, the ECU 20, the wire harness 100, and other structural elements in the engine room visually recognizable to a worker A. To the contrary, closing the hood 2 of the vehicle 1 makes the engine 10, the ECU 20, the wire harness 100, and other structural elements in the engine room visually unrecognizable to the worker A. Note that, when the worker A opens the hood 2 and visually recognizes the inside of the engine room, the worker A visually recognizes the engine room from the front side in many cases. The direction of the gaze (white hollow arrow) of the worker A will be referred to as visual recognition direction, the gaze of the worker A falling upon the engine room from the open end side of the opened hood 2 (front side of the vehicle 1).

Figure 2:
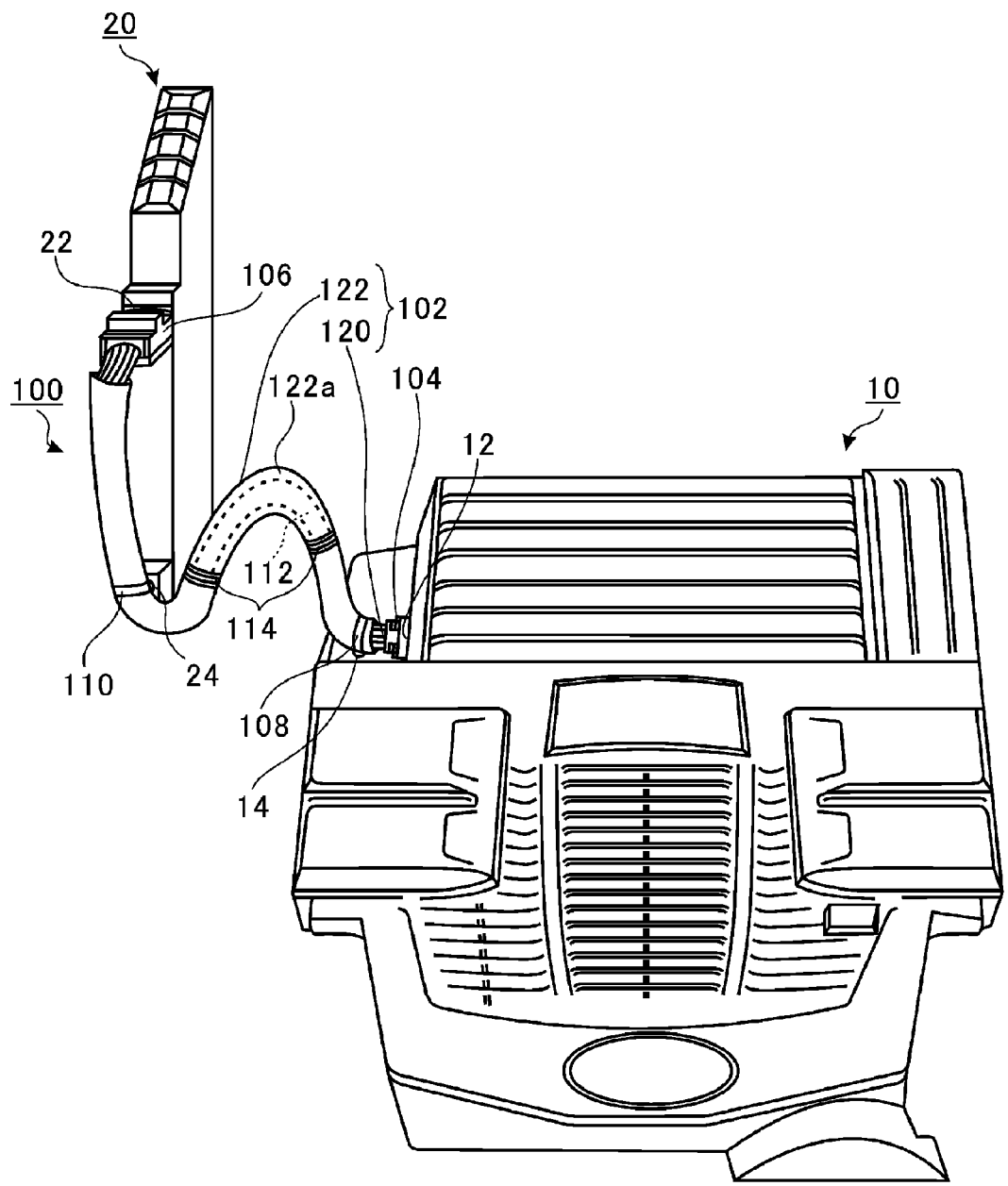
FIG. 2 describes a normal attachment state of a wire harness according to an implementation.

FIG. 2 describes a normal attachment state of the wire harness 100 according to the present implementation, and illustrates the engine 10, the ECU 20, and the wire harness 100 included in the engine room visually recognized from the visual recognition direction. FIG. 3 describes the configuration of the wire harness 100. Note that FIG. 2 illustrates only necessary structural elements of those in the engine room for describing the present implementation, and omits unnecessary structural elements. The state of a cable unit 102 (wire harness 100) attached to the vehicle 1 in a predefined attachment manner (untwisted state of the cable unit 102) is also referred to as normal attachment state.

As illustrated in FIGS. 2 and 3, the wire harness 100 includes the cable unit 102, connection terminals 104 and 106, fixation members 108 and 110, an indicator 112, and adhesive tapes 114.

The cable unit 102 includes cables 120 and a sheath 122. The cables 120 electrically connect the ECU 20 to various devices such as various sensors, spark plugs, injectors, and actuators that drive intake and exhaust valves provided in the engine 10. The cables 120 transmit detection results of the various sensors of the engine 10 from the engine 10 to the ECU 20, and transmit electrical signals for controlling the various devices from the ECU 20 to the engine 10.

The sheath 122 is, for example, black, and sheathes the bundled cables 120 in the longitudinal direction of the cables 120. The fixation members 108 and 110, the indicator 112, and the adhesive tapes 114 are provided on an outer circumference surface 122a of the sheath 122 (the cable unit 102). Additionally, when the cables 120 are bundled and sheathed by the sheath 122, the cable unit 102 has a cross section of a substantially circular shape. It will be assumed below that the cross section of the cable unit 102 has a circular shape, and the radial direction of the cross section of the cable unit 102 is referred to simply as radial direction and the circumferential direction of the cross section of the cable unit 102 is referred to simply as circumferential direction.

One end of each cable 120 is connected with the connection terminal 104, which is inserted into a terminal insertion port 12 provided in the engine 10. The other end of each cable 120 is connected with the connection terminal 106, which is inserted into a terminal insertion port 22 provided in the ECU 20.

A band 108a and a latch 108b of the fixation member 108 are formed integrally as illustrated in FIG. 3. The band 108a is wound in the circumferential direction on the outer circumference surface 122a of the sheath 122 in a manner that the fixation member 108 and the cable unit 102 do not move relative to each other. This fixes the fixation member 108 to the sheath 122. The latch 108b protrudes outwardly in the radial direction, when the fixation member 108 is fixed to the cable unit 102 by the band 108a.

FIG. 4 describes the configuration of the latch 108b of the fixation member 108 and a retainer 14 provided on the engine 10 and the ECU 20. FIG. 4 illustrates the cross section of the cable unit 102 alone for convenience of description.

As illustrated in FIG. 4, the latch 108b includes a cylindrical portion 108c of a substantially cylindrical shape, and a conical portion 108d of a substantially conical shape with a tip sharpened outwardly in the radial direction. The cylindrical portion 108c protrudes from the band 108a outwardly in the radial direction when the fixation member 108 is fixed to the cable unit 102. The conical portion 108d is provided more outwardly than the cylindrical portion 108c in the radial direction. The bottom face of the conical portion 108d (surface facing inwardly in the radial direction) has a diameter larger than the diameter of the cylindrical portion 108c.

The retainer 14 is a plate member provided at a predetermined position of the engine 10, and has a thickness as large as the height of the cylindrical portion 108c. The retainer 14 has an insertion hole 14a of a circular shape, and the diameter of the insertion hole 14a is larger than the diameter of the cylindrical portion 108c and smaller than the diameter of the bottom face of the conical portion 108d.

Inserting the conical portion 108d into the insertion hole 14a of the retainer 14 fixes the fixation member 108 with the conical portion 108d passing through the insertion hole 14a and with the side face of the cylindrical portion 108c in contact with the inner circumference surface of the insertion hole 14a. In this state of the fixation member 108, the diameter of the bottom face of the conical portion 108d is larger than the diameter of the insertion hole 14a, and thus the conical portion 108d does not drop out of the insertion hole 14a, but is latched by the retainer 14.

A fixation member 110 has the same shape as the shape of the fixation member 108, and a band 110a and a latch 110b including a cylindrical portion 110c and a conical portion 110d are integrally formed. The retainer 24 is also a plate member provided at a predetermined position of the ECU 20, and has a thickness as large as the height of the cylindrical portion 110c. The retainer 24 has an insertion hole 24a of a circular shape, and the diameter of the insertion hole 24a is larger than the diameter of the cylindrical portion 110c and smaller than the diameter of the bottom face of the conical portion 110d.

Accordingly, the fixation members 108 and 110 are fixed to the retainers 14 and 24 with the latches 108b and 110b disposed at respective predefined fixation positions in the circumferential direction in a manner that the cable unit 102 is not twisted in the circumferential direction when the wire harness 100 is attached to the vehicle 1.

Thus, when the fixation members 108 and 110 are respectively latched by the retainers 14 and 24 in a predefined attachment manner, the wire harness 100 is attached to the vehicle 1 without twisting the cable unit 102.

Returning to FIG. 3, the indicator 112 is, for example, a white tape having a predetermined width, and is provided at a substantial center between the fixation member 108 and the fixation member 110 on the outer circumference surface 122a of the sheath 122 along the longitudinal direction (the extending direction) of the cable unit 102. Specifically, using a center C0 as the center between the adjacent fixation member 108 and fixation member 110, the indicator 112 is provided from a center C1 between the center C0 and the fixation member 108 to a center C2 between the center C0 and the fixation member 110. That is, the indicator 112 is provided over two areas positioned close to the center C0, among four areas formed by equally dividing, into four, the area between the adjacent fixation member 108 and fixation member 110.

The indicator 112 is fixed to the outer circumference surface 122a of the sheath 122 with both ends wound, for example, by the black adhesive tapes 114.

Figure 5:
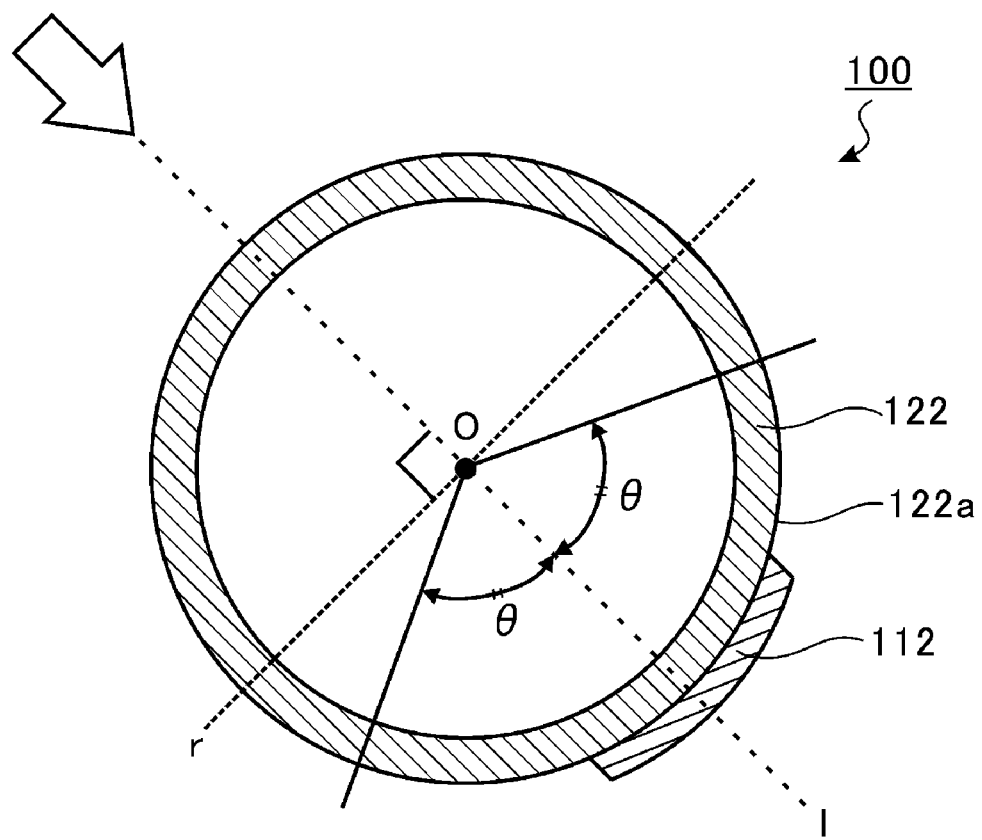
FIG. 5 is a cross-sectional view taken along a V-V line in FIG. 3.

FIG. 5 is a cross-sectional view taken along a V-V line in FIG. 3. Note that FIG. 5 does not illustrate the cables 120 for convenience of explanation, but illustrates the visual recognition direction of the worker A with a white hollow arrow. As illustrated in FIG. 5, when the wire harness 100 is attached in a predefined attachment manner, the indicator 112 is provided on a back surface portion of the outer circumference surface 122a of the sheath 122 positioned on the opposite side to a front surface portion that is visually recognized from the visual recognition direction with respect to an imaginary straight line r perpendicular to both the visual recognition direction and the longitudinal direction of the wire harness 100. Preferably, the indicator 112 is provided within an area of angles ±θ on the back surface portion of the outer circumference surface 122a in the cross section of the wire harness 100 orthogonal to the longitudinal direction with respect to an imaginary extension line 1 of the visual recognition direction. On the basis of the visual recognition direction that changes, for example, depending on the height, the visual recognition angle, and the posture of the worker A, who visually recognizes the wire harness 100, the angle θ is set at an angle at which the indicator 112 is visually unrecognizable from the visual recognition direction for the area that the worker A is supposed to visually recognize in a normal situation.

Thus, when the hood 2 of the vehicle 1 is opened, the indicator 112 of the wire harness 100 is visually unrecognizable from the visual recognition direction (direction of the gaze) of the worker A in the normal attachment state. Accordingly, it is possible to prevent the visually recognized indicator 112 from causing disfigurement.

Figure 6:
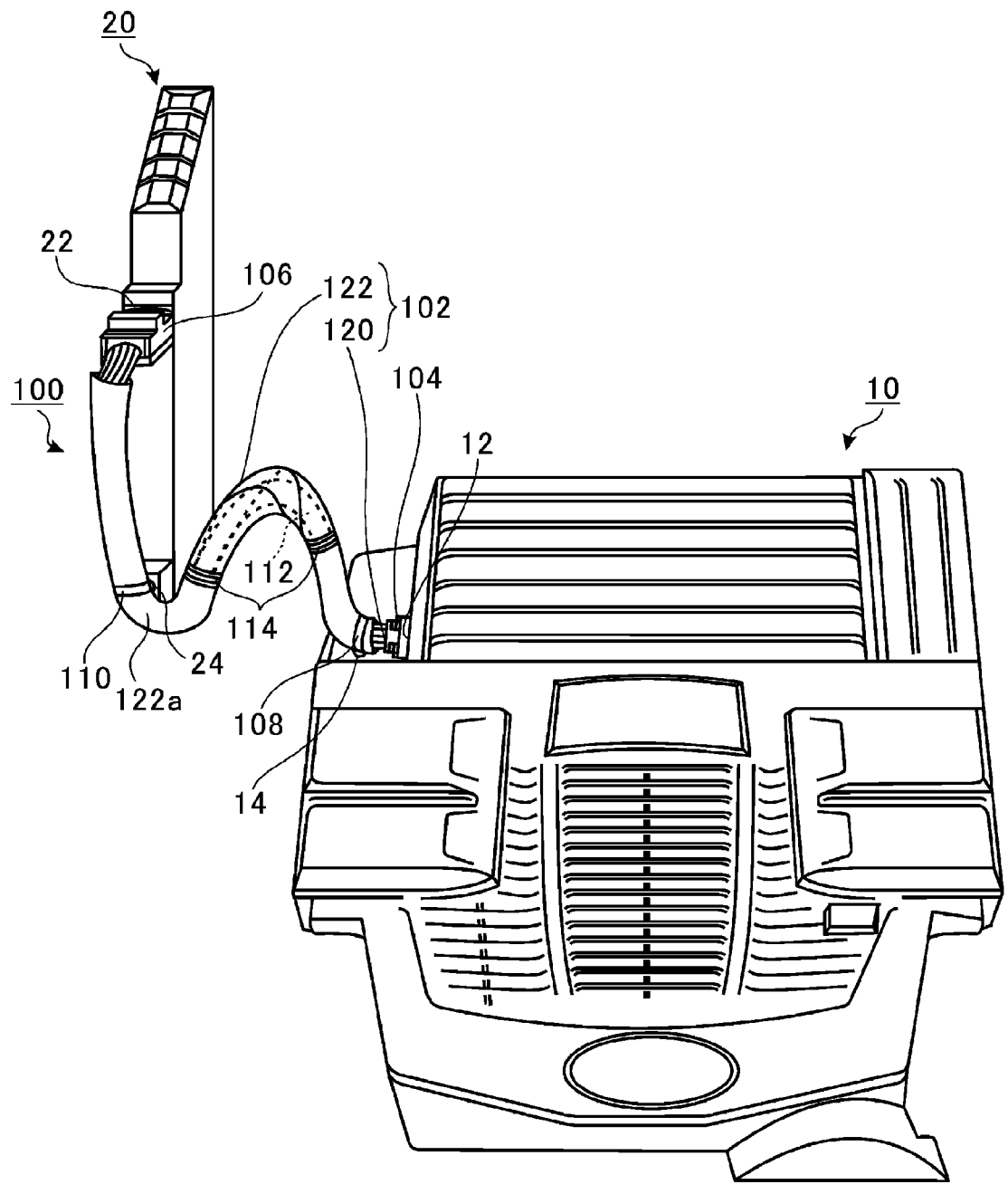
FIG. 6 describes an abnormal attachment state of the wire harness according to the present implementation.

FIG. 6 describes an abnormal attachment state of the wire harness 100 according to the present implementation. In the meantime, the latches 108b and 110b of the fixation members 108 and 110 protrude outwardly in the radial direction from predefined fixation positions in the circumferential direction, and thus can be latched by the retainers 14 and 24 even after the cable unit 102 is rotated by 360 degrees. For example, it is possible to, after the fixation member 110 is latched by the retainer 24, twist the cable unit 102 of the wire harness 100 in the circumferential direction from a predefined attachment manner, and to rotate the fixation member 108 one revolution (360 degrees) in the circumferential direction relative to the normal attachment state and latched by the retainer 14. The state of the twisted cable unit 102 in this way is referred to as abnormal attachment state. It will be described that the fixation member 108 of the wire harness 100 is rotated one revolution (360 degrees) and attached.

When the area between the fixation member 108 and the fixation member 110 is twisted by 360 degrees, the center part of the cable unit 102 between the fixation member 108 and the fixation member 110 is rotated by 180 degrees in the circumferential direction as compared with the same area that is untwisted. As described above, the indicator 112 is provided in the area from the center C1 to the center C2 (refer to FIG. 3) between the fixation member 108 and the fixation member 110, and thus the center part of the indicator 112 is also displaced by 180 degrees in the circumferential direction relative to the normal attachment state, as the cable unit 102 is rotated.

Thus, as illustrated in FIG. 6, when the wire harness 100 is in the abnormal attachment state, a part of the indicator 112 on the ECU 20 side is visually unrecognizable to the worker A, but the indicator 112 is displaced by the twist of the cable unit 102 to the position at which a part of the indicator 112 on the engine 10 side is visually recognizable to the worker A. This allows the worker A to find the twist of the cable unit 102 by visually recognizing the indicator 112.

As described above, when the wire harness 100 is attached to the vehicle 1 in a predefined attachment manner, the indicator 112 is provided on the visually unrecognizable back surface portion of the outer circumference surface 122a of the sheath 122 positioned on the opposite side to the front surface portion that is visually recognized from the visual recognition direction. Accordingly, it is possible to find the twist of the cable unit 102 without causing disfigurement.

The wire harness 100 is attached when the vehicle 1 is manufactured or checked and repaired. Accordingly, if the owner of the vehicle 1 discovers the indicator 112 upon opening the hood 2, for example, the owner can be confused in ignorance of the purpose of installation of the indicator 112. Thus, it is preferable that the indicator 112 of the wire harness 100 be visually unrecognizable when the hood 2 is opened. If so, the wire harness 100 does not cause misunderstanding by the owner of the vehicle 1.

(Another Implementation 1)

Figure 7A:
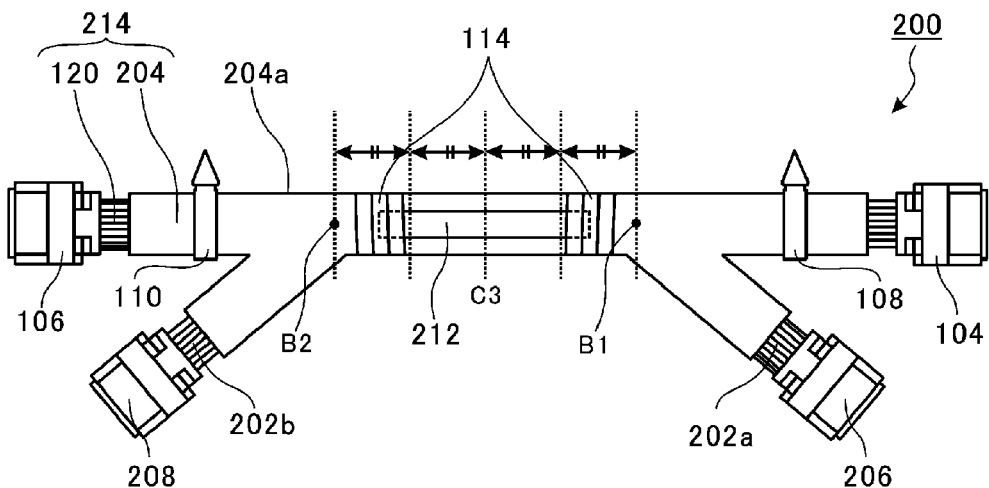
FIG. 7A illustrates a configuration of a wire harness according to another implementation.

FIG. 7A illustrates the configuration of a wire harness 200 according to another implementation 1. The wire harness 200 according to the other implementation 1 includes the same structural elements as the connection terminals 104 and 106, the fixation members 108 and 110, the adhesive tapes 114, and the cables 120 of the wire harness 100, so that the same structural elements are denoted with the same reference numerals, and their explanation is omitted.

As illustrated in FIG. 7A, the wire harness 200 includes the cables 120 serving as a main line, cables 202a and 202b serving as branch lines, a sheath 204, connection terminals 104, 106, 206 and 208, the fixation members 108 and 110, an indicator 212, and the adhesive tapes 114. The cables 202a and 202b branch from the cables 120 at branch positions B1 and B2 on the sheath 204. The indicator 212 is provided, along the longitudinal direction (the extending direction) of the cable unit 214, at a substantial center between the branch position B1, where the cables 202a serving as the branch line branch from the cables 120 serving as the main line, and the branch position B2, where the cables 202b serving as the branch line branch from the cables 120 serving as the main line. Specifically, the indicator 212 may be provided within two areas positioned close to the center C3 between the branch positions B1 and B2 among equally divided four areas. This is because twisting the cable unit 214 shows the indicator 212 in the two areas close to the center C3 on the front surface portion of the outer circumference surface 204a of the sheath 204, which is visually recognized from the visual recognition direction, and thus the indicator 212 only has to be provided in at least these areas in order to reduce the area of the indicator 212.
(Another Implementation 2)

Figure 7B:
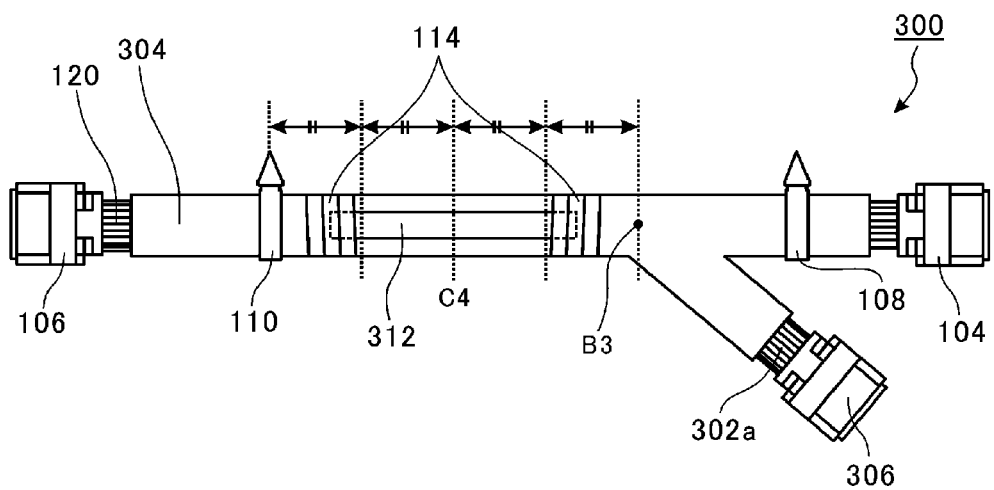
FIG. 7B illustrates a configuration of a wire harness according to another implementation.

FIG. 7B illustrates the configuration of a wire harness 300 according to another implementation 2. The wire harness 300 according to the other implementation 2 includes the same structural elements as the connection terminals 104 and 106, the fixation members 108 and 110, the adhesive tapes 114, and the cables 120 of the wire harness 100, so that the same structural elements are denoted with the same reference numerals, and their explanation is omitted.

As illustrated in FIG. 7B, the wire harness 300 includes the cables 120 serving as a main line, cables 302a serving as a branch line, a sheath 304, connection terminals 104, 106 and 306, fixation members 108 and 110, an indicator 312, and the adhesive tapes 114. The cables 302a serving as the branch line branch from the cables 120 serving as the main line at a branch position B3 on the sheath 304. The indicator 312 is provided at a substantial center between the fixation member 110 and the branch position B3, where the cables 302a serving as the branch line branch from the cables 120 serving as the main line. Specifically, the indicator 312 may be provided within two areas positioned close to the center C4 among equally divided four areas.

(Another Implementation 3)

Figure 7C:
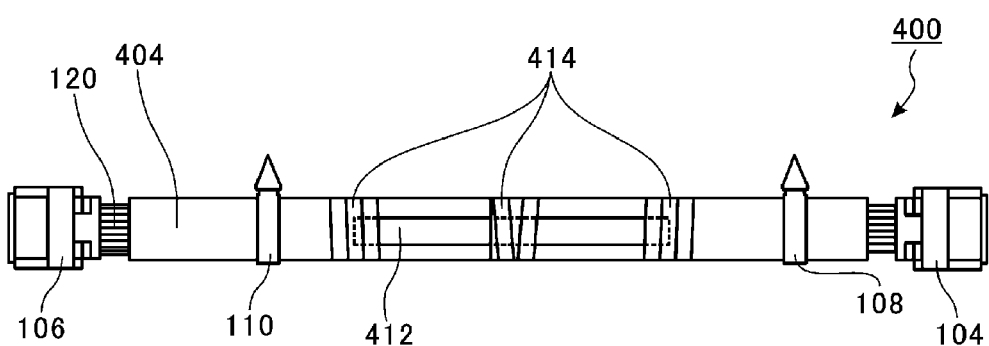
FIG. 7C illustrates a configuration of a wire harness according to another implementation.

FIG. 7C illustrates the configuration of a wire harness 400 according to another implementation 3. The wire harness 400 according to the other implementation 3 includes the same structural elements as the connection terminals 104 and 106, the fixation members 108 and 110, and the cables 120 of the wire harness 100, so that the same structural elements are denoted with the same reference numerals, and their explanation is omitted.

As illustrated in FIG. 7C, the wire harness 400 includes the cables 120, a sheath 404, the connection terminals 104 and 106, the fixation members 108 and 110, an indicator 412, and adhesive tapes 414. The indicator 412 may be fixed to the sheath 404 by winding the adhesive tapes 414 at both ends and a center part of the indicator 412 in the circumferential direction of the sheath 404.

Although the preferred examples of the present disclosure have been described in detail with reference to the appended drawings, the present disclosure is not limited thereto. It is obvious to those skilled in the art that various modifications or variations are possible insofar as they are within the technical scope of the appended claims or the equivalents thereof. It should be understood that such modifications or variations are also within the technical scope of the present disclosure.

Although, in the present implementation, the wire harness 100 connects the engine 10 and the ECU 20, the present disclosure is not limited thereto. The wire harness 100 may connect other devices or systems, and, for example, may connect an electric device and its controller provided in the vehicle 1.

Although, in the present implementation, the cable unit 102 includes, for example, the cables 120 and the sheath 122, the present disclosure is not limited thereto. The indicator 112 may be directly provided on the cables 120 without the sheath 122.

Although, in the present implementation and the other implementations, the indicator 112 is, for example, a white tape having a predetermined width, the present disclosure is not limited thereto. The indicator may be installed by any method. For example, the indicator may be installed with ink or the like.

Although, in the implementations, the indicators 112, 212, 312 and 412 are provided within two areas positioned close to the center among four areas formed by equally dividing, into four, the area between the two fixation members 108 and 110, the area between the two branch positions B1 and B2, or the area between the fixation member 110 and the branch position B3, at least only a part of the indicators 112, 212, 312 and 412 has to be provided within the two areas positioned close to the center of the four areas.

INDUSTRIAL APPLICABILITY

The present disclosure can be applied to a wire harness to be attached to a vehicle.

The invention claimed is:

1. A wire harness, comprising:
a cable unit;
fixation members that are positioned on the outer circumference surface of the cable unit, and configured to fix the cable unit to the vehicle; and
an indicator positioned on a back surface portion of an outer circumference surface of the cable unit only within a first area and a second area among four areas based on equal division, into four, of an area between a first of the two adjacent fixation members along the extending direction of the cable unit and a second of the two adjacent fixation members along the extending direction of the cable unit,
wherein the back surface portion positioned on an opposite side to a front surface portion of the outer circumference surface, and
wherein the front surface portion is visually recognizable from a gaze direction of a worker in an attachment state in which the cable unit is attached to a vehicle.

2. The wire harness according to claim 1,
wherein the indicator is further positioned, along the extending direction of the cable unit, at a substantial center between two of the adjacent fixation members along the extending direction of the cable unit.

3. The wire harness according to claim 2,
wherein the cable unit is configured to connect an engine in the vehicle and a control unit that is configured to control the engine,
wherein the indicator is further positioned on the back surface portion,
wherein the back surface portion is positioned on the opposite side to the front surface portion, that is visually recognizable from the gaze direction of the worker based on a hood that is opened, and
wherein the hood is configured to open and close an engine room that includes the engine.

4. The wire harness according to claim 1,
wherein the indicator is further positioned within the first area and the second area that are positioned close to a center among the four areas.

5. The wire harness according to claim 4,
wherein the cable unit is configured to connect an engine in the vehicle and a control unit that is configured to control the engine,
wherein the indicator is further positioned on the back surface portion,
wherein the back surface portion is positioned on the opposite side to the front surface portion, that is visually recognizable from the gaze direction of the worker based on a hood that is opened, and
wherein the hood is configured to open and close an engine room that includes the engine.

6. The wire harness according to claim 1,
wherein the indicator is further positioned, along the extending direction of the cable unit, at a substantial center between a first branch position in the cable unit where the cable unit branches and a fixation member of the fixation members that is adjacent to the first branch position or a second branch position adjacent to the first branch position.

7. The wire harness according to claim 6,
wherein the indicator is further positioned within two areas positioned close to a center among four areas based on equal division, into four, of an area between the first branch position in the cable unit where the cable unit branches and a fixation member of the fixation members that is adjacent to the first branch position or the second branch position adjacent to the first branch position.

8. The wire harness according to claim 7,
wherein the cable unit is configured to connect an engine in the vehicle and a control unit that is configured to control the engine,
wherein the indicator is further positioned on the back surface portion,
wherein the back surface portion is positioned on the opposite side to the front surface portion that is visually recognizable from the gaze direction of the worker based on a hood that is opened, and
wherein the hood is configured to open and close an engine room that includes the engine.

9. The wire harness according to claim 6,
wherein the cable unit is configured to connect an engine in the vehicle and a control unit that is configured to control the engine,
wherein the indicator is further positioned on the back surface portion,
wherein the back surface portion is positioned on the opposite side to the front surface portion, that is visually recognizable from the gaze direction of the worker based on a hood that is opened, and
wherein the hood is configured to open and close an engine room that includes the engine.

10. The wire harness according to claim 1,
wherein the cable unit is configured to connect an engine in the vehicle and a control unit that is configured to control the engine,
wherein the indicator is further positioned on the back surface portion,
wherein the back surface portion is positioned on the opposite side to the front surface portion, that is visually recognizable from the gaze direction of the worker based on a hood that is opened, and
wherein the hood is configured to open and close an engine room that includes the engine.

11. The wire harness according to claim 1, wherein the attachment state corresponds to a state in which the cable unit is untwisted.

12. The wire harness according to claim 1, wherein the indicator is further positioned within the first area and the second area based on at least one of height, visual recognition angle, or posture of the worker.

* * * * *